United States Patent [19]

Amata

[11] Patent Number: 4,551,610

[45] Date of Patent: Nov. 5, 1985

[54] TUBULAR WELDING ELECTRODE

[75] Inventor: Mario A. Amata, Chardon, Ohio

[73] Assignee: The Lincoln Electric Company, Cleveland, Ohio

[21] Appl. No.: 495,577

[22] Filed: May 17, 1983

[51] Int. Cl.$^4$ .......................................... B23K 35/362
[52] U.S. Cl. ............................ 219/146.3; 219/146.24; 219/146.31
[58] Field of Search ........... 219/146.1, 146.22, 146.24, 219/146.3, 146.31, 146.32, 145.22

[56] References Cited

U.S. PATENT DOCUMENTS

| | | | |
|---|---|---|---|
| 2,909,778 | 10/1959 | Landis et al. | 219/146.3 |
| 3,488,469 | 1/1970 | Buss | 219/146.52 |
| 3,742,185 | 6/1973 | Parks | 219/146.22 |
| 3,767,891 | 10/1973 | Haverstraw et al. | 219/146.3 |
| 4,186,293 | 1/1980 | Gonzalez et al. | 219/146.24 |

*Primary Examiner*—C. L. Albritton
*Assistant Examiner*—Alfred S. Keve
*Attorney, Agent, or Firm*—Body, Vickers & Daniels

[57] ABSTRACT

A formulation for the flux in a cored-type electric arc welding electrode which produces high impact value welds while welding vertically up or overhead and at greater melt-off rates than heretofore. The major flux ingredients are lithium oxide, iron oxide, silicon dioxide, lithium carbonate, magnesium and aluminum metal powders, all in a carefully balanced formula to give excellent operator appeal and excellent slag removal.

14 Claims, No Drawings

TUBULAR WELDING ELECTRODE

BACKGROUND OF THE INVENTION

This invention pertains to the art of electric arc welding electrodes and, more particularly, to an improved formulation of the fluxing ingredients contained on the inside of a tubular steel electrode.

The invention is particularly applicable to mild steel tubular arc welding electrodes of the self-shielding type; i.e., which do not require an independently supplied shielding gas, and will be described with particular reference thereto, although it will be appreciated that the invention is equally applicable for use with externally supplied shielding gases.

In the art of welding with mild steel tubular electrodes, wherein the fluxing ingredients are all on the inside of the tube, the lineal welding speed for a given amount of metal deposited per unit length of weld bead is determined essentially by the maximum melt-off rate of the electrode (in weight per unit of time) before the weld becomes defective due to porosity or other deleterious characteristics such as poor weld profile; cold shuts; slag inclusions; or the like.

The primary function of the fluxing ingredients is to provide conditions around the arc which limit or restrict the nitrogen of the air from coming into contact with the molten metal passing from the electrode to the molten weld pool and/or coming into contact with the molten metal in the molten weld pool itself.

As a second function, the fluxing ingredients may provide or produce free metals which transfer to the weld pool to provide an alloying effect on the mixture of the electrode and work piece molten metals in the solidified weld band. Beyond this, the residual fluxing ingredients, mostly the non-metallics, help to shape the surface of the weld bend and effect removal of the hardened slag after the weld has cooled.

Another function of the flux ingredients emphasized by the present invention is the ability of the molten slag to hold the molten weld metal in place against the forces of gravity, such as occur when welding vertically up or overhead.

Numerous efforts have been made in the past to provide flux formulations for use in the inside of a tubular electrode which will give desired welding characteristics and provide non-porous welds which meet many stringent mechanical test requirements, particularly the Charpy impact tests at low temperatures.

U.S. Pat. No. 2,909,778 (to Landis, et al and assigned to the assignee of this application) described that may be said to be the first commercially satisfactory, low-carbon steel, tubular electrode. The electrode contained large amounts of the halides of the alkali or the alkaline earth metals or aluminum fluoride as the principal shielding ingredients to exclude the nitrogen from the vicinity of the arc.

Subsequently thereto, U.S. Pat. No. 3,488,469 (to R. C. Buss and assigned to the assignee of this application), described a mild steel, tubular electrode which contained, in addition to the usual flux ingredients (including large amounts of the fluorides), an essential and novel ingredient, lithium carbonate. In this electrode, the lithium carbonate decomposed to provide carbon monoxide and carbon dioxide gases at the arc, which assisted the fluorides in protecting the arc from the nitrogen of the air. In addition, the lithium appeared to give certain beneficial effects, which at that time could not be explained.

Subsequently, U.S. Pat. No. 3,742,185 (to Parks and assigned to the assignee of this application), described various non-hygroscopic lithium compounds (such as lithium fluoride and/or lithium silicate) in combination with reducing agents (such as calcium, aluminum and/or magnesium), sufficiently active to reduce the lithium compound providing free lithium vapor in the arc which appeared to give excellent shielding characteristics.

Still subsequently, U.S. Pat. No. 3,767,891 (to Haverstraw and Landis and assigned to the assignee of this application), provided a formulation containing a sintered composite of lithium oxide, one or more of the other hygroscopic basic oxides, one or more of the acid and amphoteric metal oxides which acted as a moisture barrier to reduce or eliminate the hygroscopic tendencies of the basic oxide(s). This composite was then employed in combination with an active reducing agent(s), such as aluminum or magnesium, which reduced the basic oxides in the heat of the arc to provide a basic metal vapor around the arc to shield the nitrogen from the arc. The composite also contained substantial amounts of fluorine in the form of fluorides. The formulation did not contain any carbonates or other gas evolving compounds.

Still later, U.S. Pat. No. 4,186,293 (to Gonzalez and Young and assigned to the assignee of this application) provided a flux formulation containing larger than normal amounts of selected basic oxides while at the same time limiting the amount of other known fluxing ingredients such as the acid or amphoteric oxides, the fluorides and the deoxidizers. The basic oxides being hygroscopic were present in the form of a sinter with the acid and/or amphoteric oxides. Also, the formulation contained a carefully controlled amount of fluorine in the form of a fluoride(s).

While all of these electrodes welded satisfactorily, it was still desired to more easily weld vertical and overhead surfaces with higher maximum melt-off rates than heretofore.

The present invention succeeds wherein the others have failed in these two ultimate goals. While the ingredients used in accordance with the present invention are all conventional and well-known ingredients found in many welding fluxes, by employing a very carefully balanced formulation thereof, I have succeeded in obtaining much higher melt-off rates and have been able to easily weld on vertical and/or overhead surfaces. As will appear, the formulation contemplates the maximum possible amount of lithium oxide in a sintered composite consisting primarily of the amphoteric or acidic oxides in combination with the lithium oxide. The flux includes carefully controlled amounts of combined fluorine, aluminum, magnesium, titanium and zirconium.

Broadly stated, the flux formulation in percent by weight of the total electrode weight is as follows:

Lithium oxide ($Li_2O$): 1.8%–3.2%

Acid oxide ($SiO_2$): 0.30%–1.55%

Amphoteric oxides ($Fe_xO_y$ and/or $Mn_xO_y$): 6.0%–23.0%

Aluminum: 2.5%–5.0%

Magnesium (as a metal and/or oxide): 0.2%–2.2%

Titanium and/or zirconium (in the form of a metal, alloy or as an oxide): Enough to provide 0.01–0.24% total Ti+Zr weld bead residual $CO_2$ (in the form of carbonates) and/or $SiF_4$ (in the form of fluosilicates): 0.2%–1.5%

Combined fluorine: 0.8% maximum

The principal object of the invention is the provision of a new and improved formulation for the fill of a tubular mild steel electrode which provides an arc welding electrode having improved welding characteristics, particularly in vertical up or overhead welding, with higher melt-off rates.

Another object is the provision of a tubular steel electrode which results in, inter alia, minimum spattering, good operator appeal, high strength weld deposits and higher melt-off rates, particularly in overhead or vertical up welding.

Another object is a formulation which provides a slag which supports and retains the molten weld puddle in out-of-position welding, has enough arc force to remove slag from the top of the weld puddle, and results in a good weld bead profile.

Many factors brought out by the present invention determine the degree of success when welding out-of-position, that is to say, on vertical or overhead surfaces. Of primary importance are: the melting temperatures of the slag phases; the viscosity of each or all slag phases; the surface tension of the slag phases; the heat of fusion of the slag phases; the avoidance of super cooling; and the interbonding and bonding strength of the slag phases to support the liquid weld puddle against the force of gravity. All of these characteristics are primarily reliant on the temperature profiles that the welding process, primarily dictated by the flux formulation, generate.

In the arc welding of steel it has found that the alkali metal vapors, particularly lithium vapors, appear to physically displace the air around the arc which reduces the initial amount of nitrogen that can be diffused or convected into the molten weld puddle. This is also true of carbon dioxide (or other gases) if it is evolved at the arc by virtue of the presence of a carbonate (or other gas evolving compounds) in the fluxing ingredients.

The invention employs substantial amounts (in fact the maximum possible considering the space available on the inside of the tube and the need for other ingredients to control the slag characteristics) of lithium oxide in combination with active reducing agents such as aluminum and/or magnesium to produce lithium vapor in the arc.

Despite the favorable process temperature from the generation of lithium vapor, the melting and solidification temperature range of the molten mon-metallics in the flux ingredients which form the slag must be controlled to obtain proper bead profiles or cross-sections. Thus, as is known, a mixture of oxides will have a transformation or solidification temperature range which is a function of all the various non-metallic ingredients in the slag with the lower temperature of such range normally being lower than the minimum solidification temperatures of any one of the individual ingredients.

In addition, there is a time factor in the solidification of a slag. In the slag systems that generate a high level of alumina in solution, the rate of slag solidification is normally much too slow. Alumina and aluminates tend to have high latent heats which result in a slow rate of transformation from liquid to solid. Thus, they are not employed as original flux ingredients. However, the aluminum which reduces the lithium oxide (or any other metal oxides normally present in the flux ingredients) in turn itself becomes alumina with this undesirable result.

To compensate for this, other ingredients are included. However, the presence of these other desired and/or essential components normally applied in welding fluxes can result in a freezing range which is catastrophically too low. The present invention, however, provides a periclase phase system achieved by the addition of magnesite or magnesium metal to the system. By controlling the amounts of alumina and magnesite in the slag, the proper balance between these phases will properly locate and freeze the slag to achieve acceptable weld bead profile.

In addition to obtaining a slag which has the proper freezing ranges, the solidifying slag must be capable of supporting the liquid puddle against the forces of gravity. When a slag fails to wet a significant portion of the weld surface, the solidifying skin of the weld metal is not capable of retaining the molten puddle against the forces of gravity and the molten metal runs out of the weld puddle.

In addition to this, the slag may also fail to support the weld puddle, even though present across the entire weld surface, because the slag lacks the strength to resist the gravitational forces or because of poor interphase bonding. To overcome this latter difficulty, I have found that silica is desirably included in the flux.

The combination of slag surface tension characteristics and slag viscosity is important in regulating the arc's smoothness, the ease of manual operation, and the tendency to trap slag within the weld. Thus, if solidified slag is floating on top of the weld puddle, the best efforts of an operator cannot produce good welds and broaden the applicability of the process. Therefore, the present invention proposes to either reduce the melting point of the slag or its viscosity and/or decrease its surface tension when it is found in the vicinity of the weld puddle. Constituents which assist in the accomplishment of this function of controlling the flow characteristics of the molten slag are the alkali and alkaline earth metal fluorides and/or the alkaline earth metal oxides.

Complimentary to this objective, the invention contemplates an ingredient which generates a positive arc force to disperse the floating slag away from the approaching arc. Such ingredients are the fluosilicates and/or carbonates which will evolve a gas in the heat of the arc to forcefully displace any slag particles which might otherwise be buoyed on the weld pool. However, the amount of such gas evolving ingredients must be limited. Too much causes spatter which disturbs the operator, is unsightly, and must be cleaned up.

Large amounts of the halides must be avoided for two reasons: the overall range of melting temperatures is too low and the arc characteristics and weld metal transfer potential are believed to be unduly limited. While fluorides can be considered as beneficial to accomplish the foregoing objectives, the ingredients in the flux containing fluorine are limited such that there is less than 0.8% of combined fluorine in the fluorine compounds.

Importantly, titanium and/or zirconium are included in the ingredients, either as a metal and/or alloy and/or as an oxide thereof which is reduced to the base metal by the other highly reactive reducing agents in the flux ingredients; e.g., aluminum and/or magnesium, in such amounts as to produce a total residual of the two in the weld metal of between 0.01% to 0.24%. This residual can result from the following individual alternatives:

(a) Zirconium (as a metal or an alloy): 0.10–1.5%
(b) Zirconium oxide: 0.30–6.3%
(c) Titanium (as a metal or an alloy): 0.025–0.42%
(d) Titanium oxide: 0.050–1.5%

The residual of either titanium or zirconium should not exceed 0.15%.

If two or more of these alternatives are used, then the minimums and/or maximums for each used must be appropriately scaled up or down so as to produce the desired weld deposit residual. With the oxides, the percentage of recovery of the metal decreases somewhat as the percentage of the oxide increases. Whether the amounts of these ingredients come within the scope of the invention, can only be determined by laboratory tests of actual weld deposits.

Titanium and/or zirconium contribute to notch toughness and reduce the tendency to form porosity which would result in rejection of the weld.

It is also desirable that the solidified slag be readily removable from the surface of the weld bead. The presence of a fluoride in the slag assists in its removability.

Aluminum is included as one of the fluxing ingredients as a reducing agent in amounts to insure substantial reduction of reducible oxides. To insure this, there must always be a residual amount of unreacted aluminum which then transfers to the weld pool and is present in the weld deposit as an aluminum residual. Using the present invention, the aluminum residual can be around 0.5%.

The present invention found that because of the excellent shielding of the arc and the weld deposit by the various ingredients employed; e.g., lithium and the evolved gases; e.g., $CO_2$, it was unnecessary to have aluminum in the flux ingredients, in an amount that would result in an aluminum residual in excess of 0.5%. Deposits of: 0.10% carbon; 0.3–0.5% aluminum; 0.3–1.2% manganese; 0.2–0.4% silicon; and, less than total 0.12% titanium and/or zirconium, and tested in accordance with AWS at 5.20-79, have yielded Charpy impact results in excess of 40 ft. lbs. at −60° F.

Lithium oxide is, of course, known to be hygroscopic. Accordingly, it is always mixed with at least one of the acid and/or amphoteric oxides in a one to one (or one to just slightly greater than one) mole ratio and sintered to a composite or compound at an elevated temperature. Importantly, other basic oxides, e.g., barium or calcium oxide, are limits in the sinter. The presence of such oxides would reduce the maximum amount of the lithium oxide which can be included in the sinter and the presence of lithium oxide in the maximum amount possible is desired. The acid and/or amphoteric oxide(s) shields the lithium oxide from the water vapor of the atmosphere and substantially reduces or eliminates its hygroscopic characteristics. The ratios stated are important to provide the maximum amount of lithium with an acceptable reduction of hygroscopic characteristics.

The present invention primarily uses lithium to achieve a high rate of deposit, out-of-position weldability, to suppress nitrogen boil, and to generate a compatible slag. Because lithium oxide as employed necessitates the use of other stabilizing ingredients in the composite sinter, and because there is a need for large amounts of low density lithium oxide, the amounts employed render the lithium oxide relatively non-hygroscopic and the composite is essentially free of the alkaline earth oxides, stabilizing additives and/or amphoteric oxides beyond the level required for a binary compound and an insuring marginal excess.

The amount of lithium oxide employed is generally within the ranges specified in some of the above referred to patents owned by the assignee of this application. The amount of amphoteric oxides present is substantially higher than that described in said patents. It is believed that the higher amounts of these oxides, in conjunction with as high as possible amounts of lithium oxide, enables a tubular steel welding electrode which can have a maximum weight of fluxing ingredients expressed as a percentage of electrode weight which enables the high melt-off rate of this electrode. Furthermore, with the large amounts of easily reducible manganese oxide and/or iron oxide present in the welding ingredients, it is possible to use more aluminum as a reducing agent than heretofore, while still having a low residual aluminum in the solidified weld bead.

The higher amounts of aluminum are beneficial because when this aluminum reacts with the oxide, an exothermic reaction occurs which desirably adds heat to the arc to counteract the effect of a very cold arc normally resulting from the use of lithium.

The flux ingredients do not contain any aluminum oxides. On the other hand, one of the principal ingredients in the resultant slag is aluminum oxide. This aluminum oxide results from the reaction of the aluminum powder in the flux ingredients with the various oxides of lithium, iron, manganese, silicon and/or titanium, resulting in the formation of aluminum oxide and the release of the metal of the oxide which, in the case of the lithium, shields the arc from the atmosphere and, in the case of the acid or amphoteric oxides, results in release of the metals and their transfer to the weld bead either as iron or as an alloying ingredient. Manganese, of course, is considered desirable as a residual and silicon is satisfactory as an ingredient, providing it is not present in excessive amounts. For optimum bead profile, the level of magnesium or magnesia must be carefully controlled.

The specific example of flux formulations which have proven successful in practice are as follows, expressed in weight percent of the total electrode weight (in all instances the balance is the weight of the low carbon steel tube):

| FORMULA I | | |
|---|---|---|
|  | MEAN | RANGE |
| Lithium ferrate sinter ($Li_2O \cdot Fe_xO_y$) | 5.61 | 5.27–5.96 |
| Magnesium aluminum powder (MgAl) | 3.04 | 2.85–3.23 |
| Aluminum powder (Al) | 2.29 | 2.14–2.43 |
| Lithium carbonate ($Li_2O \cdot CO_2$) | .46 | .43–0.49 |
| Lithium ferrate-Lithium silicate sinter ($Li_2O \cdot SiO_2Fe_xO_y$) | 5.61 | 5.27–5.96 |
| Lithium manganate-Lithium silicate sinter ($Li_2O \cdot SiO_2 \cdot Mn_xO_y$) | 2.03 | 1.90–2.15 |
| Lithium titanate ($Li_2O \cdot TiO_2$) | .61 | .57–.65 |
| Lithium fluoride (LiF) | .61 | .57–.65 |

In this formula and in the formulas hereafter and in the claims, the amounts of the metals are as follows:
  $Li_2O \cdot Fe_xO_y$        7% Li, 58% Fe
  MgAl                          55% Mg, 45% Al
  $Li_2O \cdot SiO_2Fe_xO_y$   8.5% Li, 50% Fe, 5.3% Si
  AlZr                          42.7% Al, 58% Zr
  FeTi                          40% Ti Composition range expressed in elemental, compound or compound fragments:

| Element, etc. | Range |
| --- | --- |
| Li₂O | 2.44-2.78 |
| Al | 3.71-4.21 |
| Mg | 1.28-1.45 |
| CO₂ | .26-.29 |
| SiO₂ | .99-1.13 |
| Fe$_x$O$_y$ | 8.15-9.21 |
| Mn$_x$O$_y$ | 1.27-1.44 |
| TiO₂ | .42-.57 |
| LiF | .57-.65 |

Composition expressed in oxide groupings:
Basic Oxides (alkali+alkaline earth oxide): 2.44-2.78
Acid Oxide (SiO₂): 0.99-1.13
Amphoteric Oxide (Fe$_x$O$_y$+Mn$_x$O$_y$): 9.42-10.65

FORMULA II

| | Mean | Range |
| --- | --- | --- |
| Lithium ferrate sinter (Li₂O.Fe$_x$O$_y$) | 5.77 | 5.41-6.13 |
| Magnesium/aluminum powder (MgAl) | 3.12 | 2.92-3.31 |
| Aluminum powder (Al) | 2.04 | 1.92-2.17 |
| Lithium carbonate (Li₂O.CO₂) | .49 | .45-.52 |
| Lithium ferrate-Lithium silicate sinter (Li₂O.SiO₂.Fe$_x$O$_y$) | 5.77 | 5.41-6.13 |
| Lithium manganate-Lithium silicate sinter (Li₂O.SiO₂.Mn$_x$O$_y$) | 2.09 | 1.95-2.21 |
| Aluminum zirconium powder (Al:Zr) | .24 | .22-.26 |
| Lithium titanate (Li₂O.TiO₂) | .30 | .28-.32 |
| Sodium titanate (Na₂O.4TiO₂) | .30 | .28-.32 |
| Lithium fluoride (LiF) | .12 | .11-.13 |

Composition expressed in oxide groupings:
Basic Oxides: 2.49-2.83
Acid Oxide: 1.02-1.16
Amphoteric Oxide: 9.65-10.94

FORMULA III

| | Mean | Range |
| --- | --- | --- |
| Lithium ferrate sinter (Li₂O.Fe$_x$O$_y$) | 4.48 | 4.20-4.75 |
| Magnesium/aluminum powder (MgAl) | 3.10 | 2.91-3.29 |
| Aluminum powder (Al) | 2.13 | 2.00-2.26 |
| Lithium carbonate (Li₂O.CO₂) | 1.44 | 1.35-1.53 |
| Barium carbonate | .63 | .59-.67 |
| Foundry Ferro-titanium powder (Fe.Ti) | .40 | .38-.43 |
| Magnesite (M$_g$O) | .40 | .38-.43 |
| Potassium fluosilicate (K₂SiF₆) | .061 | .057-.064 |
| Lithium ferrate-Lithium silicate sinter (Li₂O.SiO₂.Fe$_x$O$_y$) | 7.61 | 7.14-8.08 |

Composition range expressed in elemental, compound, or compound fragments.

| Element, etc. | Range |
| --- | --- |
| Li₂O | 2.49-2.82 |
| Al | 3.61-4.07 |
| Mg | 1.30-1.48 |
| MgO | .38-.43 |
| BaO | .46-.52 |
| CO₂ | .93-1.06 |
| Ti | .15-.17 |
| K₂SiF₆ | .057-.064 |
| SiO₂ | .86-.97 |
| Fe$_x$O$_y$ | 8.54-9.66 |

Composition expressed in oxide groupings:
Basic Oxides: 3.33-3.77
Acid Oxide: 0.86-0.97
Amphoteric Oxide: 8.54-9.66

FORMULA IV

| | Mean | Range |
| --- | --- | --- |
| Lithium ferrate sinter (Li₂O.Fe$_x$O$_y$) | 3.38 | 3.17-3.59 |
| Magnesium/aluminum powder (MgAl) | 3.10 | 2.91-3.29 |
| Aluminum powder (Al) | 2.03 | 1.90-2.15 |
| Lithium carbonate (Li₂O.CO₂) | 1.44 | 1.35-1.53 |
| Barium carbonate | .51 | .48-.54 |
| Foundry Ferro-titanium powder (Fe.Ti) | .40 | .38-.53 |
| Magnesite (MgO) | .40 | .38-.53 |
| Potassium fluosilicate (K₂SiF₆) | .101 | .095-.108 |
| Lithium ferrate-Lithium silicate sinter (Li₂O.SiO₂Fe$_x$O$_y$) | 7.61 | 7.14-8.08 |
| Aluminum zirconium powder (Al.Zr) | .20 | .19-.21 |
| Iron powder (Fe) | 1.07 | 1.00-1.14 |

Composition range expressed in elemental, compound or compound fragments:

| Element, etc. | Range |
| --- | --- |
| Li₂O | 2.33-2.65 |
| Al | 3.58-4.05 |
| Mg | 1.31-1.48 |
| MgO | .38-.53 |
| BaO | .37-.42 |
| CO₂ | .91-1.03 |
| Ti | .15-.21 |
| K₂SiF₆ | .095-.108 |
| SiO₂ | .86-.97 |
| Zr | .11-.12 |
| Fe$_x$O$_y$ | 7.67-8.67 |
| Fe | 1.23-1.46 |

Composition expressed in oxide groupings:
Basic Oxides: 3.08-3.60
Acid Oxide: 0.86-0.97
Amphoteric Oxides: 7.67-8.67

FORMULA V

| | Mean | Range |
| --- | --- | --- |
| Lithium ferrate sinter (Li₂O.Fe$_x$O$_y$) | 3.38 | 3.17-3.59 |
| Magnesium/aluminum powder (MgAl) | 3.10 | 2.91-3.29 |
| Aluminum powder (Al) | 1.76 | 1.65-1.87 |
| Lithium carbonate (Li₂O.CO₂) | 1.44 | 1.35-1.53 |
| Barium carbonate | .51 | .48-.54 |
| Foundry Ferro-titanium powder (Fe.Ti) | .40 | .38-.43 |
| Magnesite (MgO) | .81 | .76-.86 |
| Potassium fluosilicate (K₂SiF₆) | .101 | .095-.108 |
| Lithium ferrate-Lithium silicate sinter (Li₂OSiO₂.Fe$_x$O$_y$) | 7.61 | 7.14-8.08 |
| Aluminum zirconium powder (Al.Zr) | .40 | .38-.43 |
| Iron powder (Fe) | .63 | .59-.67 |

Composition range expressed in elemental, compound, or compound fragments:

| Element, etc | Range |
| --- | --- |
| Li₂O | 2.33-2.65 |
| Al | 3.40-3.85 |
| Mg | 1.31-1.48 |
| MgO | .76-.86 |
| BaO | .37-.42 |
| CO₂ | .91-1.03 |
| Ti | .15-.17 |
| K₂SiF₆ | .095-.108 |
| SiO₂ | .86-.97 |
| Zr | .23-.26 |
| Fe$_x$O$_y$ | 7.67-8.67 |
| Fe | .82-.93 |

Composition expressed in oxide groupings:
Basic Oxides: 3.46-3.93

Acid Oxide: 0.86–0.97
Amphoteric Oxides: 7.67–8.67

FORMULA VI

|  | Mean | Range |
|---|---|---|
| Lithium ferrate sinter ($Li_2O.Fe_xO_y$) | 3.38 | 3.17–3.59 |
| Magnesium/aluminum powder (MgAl) | 3.10 | 2.91–3.29 |
| Aluminum powder (Al) | 1.86 | 1.75–1.98 |
| Lithium carbonate ($Li_2O.CO_2$) | 1.44 | 1.35–1.53 |
| Barium carbonate | .51 | .48–.54 |
| Foundry Ferro-titanium powder (Fe.Ti) | .40 | .38–.43 |
| Magnesite (MgO) | .81 | .76–.86 |
| Potassium fluosilicate ($K_2SiF_6$) | .101 | .095–.108 |
| Lithium ferrate-Lithium silicate sinter ($Li_2O.SiO.Fe_xO_y$) | 7.61 | 7.14–8.08 |
| Aluminum zirconium powder (Al.Zr) | .40 | .38–.43 |
| Iron powder (Fe) | .63 | .59–.67 |

Composition range expressed in elemental, compound, or compound fragments:

| Element, etc. | Range |
|---|---|
| $Li_2O$ | 2.33–2.65 |
| Al | 3.50–3.96 |
| Mg | 1.31–1.48 |
| MgO | .76–.86 |
| BaO | .37–.42 |
| $CO_2$ | .91–1.03 |
| Ti | .15–.17 |
| $K_2SiF_6$ | .095–.108 |
| $SiO_2$ | .86–.97 |
| Zr | .23–.26 |
| $Fe_xO_y$ | 7.67–8.67 |
| Fe | .82–.93 |

Composition expressed in oxide groupings:
Basic Oxides: 3.46–3.88
Acid Oxide: 0.86–0.97
Amphoteric Oxides: 7.67–8.67
Typical welding conditions are as follows:

| Electrode Polarity Electrical Stickout | Normal Settings | | | |
|---|---|---|---|---|
|  | Arc Voltage (volts) | Wire Feed Speed (in/min) | Approx Current (Amps) | Weld Metal Deposit Rate (lbs/hr) |
| .072 | 16–18 | 80 min. | 130 | 3.3 |
| DC(–) | 18–21 | 140 | 225 | 5.5 |
| ½" to 1" | 19–22 | 155 | 240 | 6.0 |
| Electrical | 20–23 | 170 Opt | 255 | 6.5 |
| Stickout | 22–24 | 250 | 315 | 9.6 |
|  | 23–25 | 290 | 350 | 11.0 |
| 5/64 | 16 | 50 | 130 | 2.8 |
| DC(–) | 18 | 100 | 205 | 4.8 |
| ½" to 1" | 21 | 130 | 255 | 6.2 |
| Electrical | 23 | 180 | 325 | 8.5 |
| Stickout | 25 | 215 | 355 | 10.2 |

Mechanical Properties obtained using multiple pass welding procedures and tested in accordance with AWS A5.20-79 and ASME SFA-5.20:

|  | Yield Strength (psi) | Tensile (psi) | % El. | Charpy V-Notch a-20° F. |
|---|---|---|---|---|
| Minimum Requirements for ETIT-8 | 60,000 | 72,000 | 22 | 20 ft-lbs. |
| Test Results+ | 60,000–72,000 | 72,000–88,000 | 22–30 | 20–52 ft-lbs. |

+Tensile bar tested in the aged condition per AWS A5.20-79.

To help control slag viscosity barium oxide and/or calcium oxide can be included with the total amount being less than 1.5% of the electrode weight.

The invention has been described with reference to specific formulations of various known flux ingredients, some sintered in unique combinations. Obviously, modifications and alterations in these formulations will occur to others upon a reading and understanding of this specification. It is my intention to include all such modifications and alterations insofar as they come within the scope of the appended claims.

Having thus described my invention, I claim:

1. An arc welding electrode comprised of a tube of low carbon steel having on the inside thereof as major ingredients, as percentage of total electrode weight:
   Lithium oxide ($LiO_2$): 1.8–3.2%
   One or more amphoteric oxides selected from the class consisting of $Fe_xO_y$ and $Mn_xO_y$: 6.0–23%
   Aluminum: 2.5–5.0%
   Magnesium: 0.2–2.2%
   the lithium oxide being present in a sintered composite with the amphoteric oxide(s) in a one to at least one mole ratio.

2. The electrode of claim 1 including as an additional ingredient an acid oxide such as $SiO_2$ in amount of 0.30–1.55%.

3. The electrode of claim 1 including, as an additional ingredient, one or more alloying ingredient(s) selected from the class consisting of:
   Titanium metal in an amount of 0.025–0.42%;
   Zirconium metal in an amount of 0.10–1.5%;
   Titanium oxide in an amount of 0.050–1.5%;
   Zirconium oxide in an amount of 0.30–6.3%;
   but so limited that the total percentage residual of titanium plus zirconium in the weld deposit is between 0.01% and 0.24% with the residual of either titanium or zirconium not exceeding 0.15%.

4. The electrode of claim 1 including one or more gas forming ingredient(s), selected from the class consisting of: carbonates and fluosilicates in an an amount of 0.2 to 1.5%.

5. The electrode of claim 3 including as an additional ingredient an
   acid oxide such as $SiO_2$ in an amount of 0.30–1.55%.

6. The electrode of claim 5 including one or more gas forming ingredient(s) selected from the class consisting of: carbonates and fluosilicates in an amount of 0.2 to 1.5%.

7. The electrode of claim 2 including one or more gas forming ingredient(s) selected from the class consisting of: carbonates and fluosilicates in an amount of 0.2 to 1.5%.

8. An arc welding electrode comprised of a tube of low carbon steel having on the inside thereof as major ingredients, as percentage of total electrode weight:
   Lithium ferrate sinter ($Li_2O.Fe_xO_y$): 5.27–5.96%
   Magnesium/aluminum powder (MgAl): 2.85–3.23%
   Aluminum powder (Al): 2.14–2.43%
   Lithium carbonate ($Li_2O.CO_2$): 0.43–0.49%
   Lithium ferrate-Lithium silicate sinter ($Li_2O.SiO_2.Fe_x.O_y$): 5.27–5.96%
   Lithium manganate-Lithium silicate sinter ($Li_2O.SiO_2.Mn_xO_y$): 1.90–2.15%
   Lithium titanate ($Li_2O.TiO_2$): 0.57–0.65%
   Lithium fluoride (LiF): 0.57–0.65%
   the lithium oxide being present in a sintered composite with the iron and manganese oxides in a one to at least one mole ratio.

9. An arc welding electrode comprised of a tube of low carbon steel having on the inside thereof as major ingredients, as percentage of total electrode weight):

Lithium ferrate sinter ($Li_2O.Fe_xO_y$): 5.41–6.13%
Magnesium/aluminum powder (MgAl): 2.92–3.31%
Aluminum powder (Al): 1.92–2.17%
Lithium carbonate ($Li_2O.CO_2$): 0.45–0.52%
Lithium ferrate-Lithium silicate sinter ($Li_2O.SiO_2.Fe_xO_y$): 5.41–6.13%
Lithium manganate-Lithium silicate sinter ($Li_2O.SiO_2.Mn_xO_y$): 1.95–2.21%
Aluminum zirconium powder (Al.Zr): 0.22–0.26%
Lithium titanate ($Li_2O.TiO_2$): 0.28–0.32%
Sodium titanate ($Na_2O.4TiO_2$): 0.28–0.32%
Lithium fluoride (LiF): 0.11–0.13% the lithium oxide being present in a sintered composite with the iron and manganese oxides in a one to at least one mole ratio.

10. An arc welding electrode comprised of a tube of low carbon steel having on the inside thereof as major ingredients, as percentage of total electrode weight:
Lithium ferrate sinter ($Li_2O.Fe_xO_y$): 4.20–4.75%
Magnesium/aluminum powder (MgAl): 2.91–3.29%
Aluminum powder (Al): 2.00–2.26%
Lithium carbonate ($Li_2O.CO_2$): 1.35–1.53%
Barium carbonate: 0.59–0.67%
Foundry Ferro-titanium powder (Fe.Ti): 0.38–0.43%
Magnesite (MgO): 0.38–0.43%
Potassium fluosilicate ($K_2SiF_6$): 0.057–0.064%
Lithium ferrate-Lithium silicate sinter ($Li_2O.SiO_2.Fe_xO_y$): 7.14–8.08% the lithium oxide being present in a sintered composite with the iron oxides in a one to at least one mole ratio.

11. An arc welding electrode comprised of a tube of low carbon steel having on the inside thereof as major ingredients, as percentage of total electrode weight:
Lithium ferrate sinter ($Li_2O.Fe_xO_y$): 3.17–3.59%
Magnesium aluminum powder (MgAl): 2.91–3.29%
Aluminum powder (Al): 1.90–2.15%
Lithium carbonate ($Li_2O.CO_2$): 1.35–1.53%
Barium carbonate: 0.48–0.54%
Foundry Ferro-titanium powder (Fe.Ti): 0.38–0.53%
Magnesite (MgO): 0.38–0.53%
Potassium fluosilicate ($K_2SiF_6$): 0.095–0.108%
Lithium ferrate-Lithium silicate sinter ($Li_2O.SiO_2.Fe_xO_y$): 7.14–8.08%
Aluminum zirconium powder (Al.Zr): 0.19–0.21%
Iron powder (Fe): 1.00–1.14% the lithium oxide being present in a sintered composite with the iron oxides in a one to at least one mole ratio.

12. An arc welding electrode comprised of a tube of low carbon steel having on the inside thereof as major ingredients, as percentage of total electrode weight:
Lithium ferrate sinter ($Li_2O.Fe_xO_y$): 3.17–3.59%
Magnesium/aluminum powder (MgAl): 2.91–3.29%
Aluminum powder (Al): 1.65–1.87%
Lithium carbonate ($Li_2O.CO_2$): 1.35–1.53%
Barium carbonate: 0.48–0.54%
Foundry Ferro-titanium powder (Fe.Ti): 0.38–0.43%
Magnesite (MgO): 0.76–0.86%
Potassium fluosilicate ($K_2SiF_6$): 0.095–0.108%
Lithium ferrate-Lithium silicate sinter ($Li_2OSiO_2.Fe_xO_y$): 7.14–8.08%
Aluminum zirconium powder (Al.Zr): 0.38–0.43%
Iron powder (Fe): 0.59–0.67% the lithium oxide being present in a sintered composite with the iron oxides in a one to at least one mole ratio.

13. An arc welding electrode comprised of a tube of low carbon steel having on the inside thereof as major ingredients, as percentage of total electrode weight:
Lithium ferrate sinter ($Li_2O.Fe_xO_y$): 3.17–3.59%
Magnesium aluminum powder (MgAl): 2.91–3.29%
Aluminum powder (Al): 1.75–1.98%
Lithium carbonate ($Li_2O.CO_2$): 1.35–1.53%
Barium carbonate: 0.48–0.54%
Foundry Ferro-titanium powder (Fe.Ti): 0.38–0.43%
Magnesite (MgO): 0.76–0.86%
Potassium fluosilicate ($K_2SiF_6$): 0.095–0.108%
Lithium ferrate-Lithium silicate sinter ($Li_2O.SiO.Fe_xO_y$): 7.14–8.08%
Aluminum zirconium powder (Al.Zr): 0.38–0.43%
Iron powder (Fe): 0.59–0.67% the lithium oxide being present in a sintered composite with the iron oxides in a one to at least one mole ratio.

14. The electrode of claim 4 including, one or more alloying ingredient(s) selected from the class consisting of:
Titanium metal in an amount of 0.25–0.42%;
Zirconium metal in an amount of 0.10–1.5%;
Titanium oxide in an amount of 0.050–1.5%;
Zirconium oxide in an amount of 0.30–6.3%;

but so limited that the total percentage residual of titanium plus zirconium in the weld deposit is between 0.01% and 0.24% with the residual of either titanium or zirconium not exceeding 0.15%.

* * * * *